United States Patent
Tamm et al.

(10) Patent No.: US 12,076,821 B2
(45) Date of Patent: Sep. 3, 2024

(54) ORBITAL WELDING DEVICE WITH IMPROVED RESIDUAL OXYGEN MEASUREMENT

(71) Applicant: ILLINOIS TOOL WORKS INC., Glenview, IL (US)

(72) Inventors: Markus Tamm, Uberlingen (DE); Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 370 days.

(21) Appl. No.: 17/291,062

(22) PCT Filed: Oct. 31, 2019

(86) PCT No.: PCT/US2019/058996
§ 371 (c)(1),
(2) Date: May 4, 2021

(87) PCT Pub. No.: WO2020/096847
PCT Pub. Date: May 14, 2020

(65) Prior Publication Data
US 2021/0379706 A1    Dec. 9, 2021

(30) Foreign Application Priority Data
Nov. 9, 2018   (EP) .................................... 18205526

(51) Int. Cl.
*B23K 9/00*      (2006.01)
*B23K 9/028*     (2006.01)
(Continued)

(52) U.S. Cl.
CPC ........ *B23K 37/0217* (2013.01); *B23K 9/0286* (2013.01); *B23K 9/0956* (2013.01);
(Continued)

(58) Field of Classification Search
CPC ............. B23K 37/0217; B23K 9/0286; B23K 9/0956; B23K 9/16; B23K 37/027;
(Continued)

(56) References Cited

U.S. PATENT DOCUMENTS 4,541,055 A * 9/1985 Wolfe ................ B23K 26/1437
700/166
2012/0140234 A1   6/2012 Masterson
(Continued)

FOREIGN PATENT DOCUMENTS

CN       106794542 A  *  5/2017    ............. B23K 10/00
DE       102011119700 A1    6/2012
(Continued)

OTHER PUBLICATIONS

PCT, International Search Report and Written Opinion, International Application No. PCT/US2019/058996; date of mailing Feb. 28, 2020, 13 pages.

*Primary Examiner* — Kiley S Stoner
(74) *Attorney, Agent, or Firm* — McAndrews, Held & Malloy, Ltd.

(57) ABSTRACT

An orbital welding device (1), having a welding current source (10) in a welding current source housing (11) and an orbital welding head (20), which is separate from the welding current source housing (11) and is connected to the welding current source (10) by a cable (2), the orbital welding head (20) having a pipe mount (21) and a welding electrode holder (22) for holding a welding electrode (23). An electric motor (31) is designed to drive the welding electrode holder (22) and thus turn it with respect to the pipe mount (21). The orbital welding head (20) has a chamber (50) for shielding gas. An optical oxygen sensor (40) is designed to measure an oxygen concentration in a measuring region (51) in the chamber (50). The oxygen sensor (40) is
(Continued)

arranged outside the chamber (50) and is optically coupled to the measuring region (51) by an optical coupling.

7 Claims, 4 Drawing Sheets

(51) Int. Cl.
  *B23K 9/095* (2006.01)
  *B23K 9/16* (2006.01)
  *B23K 9/32* (2006.01)
  *B23K 37/02* (2006.01)
  *B23K 101/06* (2006.01)
(52) U.S. Cl.
  CPC ................. *B23K 9/16* (2013.01); *B23K 9/326* (2013.01); *B23K 37/027* (2013.01); *B23K 37/0276* (2013.01); *B23K 2101/06* (2018.08)
(58) Field of Classification Search
  CPC .......... B23K 37/0276; B23K 2101/06; B23K 9/291; B23K 9/325–326
  USPC ............ 228/8, 103, 42, 218–220, 44.5, 49.3
  See application file for complete search history.

(56) References Cited

U.S. PATENT DOCUMENTS

| | | | |
|---|---|---|---|
| 2016/0003738 A1* | 1/2016 | Harder | B23K 9/32 |
| | | | 250/206 |
| 2016/0074955 A1* | 3/2016 | Evans | B23K 9/16 |
| | | | 228/42 |
| 2016/0221107 A1* | 8/2016 | Kadlec | B23K 26/21 |

FOREIGN PATENT DOCUMENTS

| | | | | |
|---|---|---|---|---|
| DE | 202014100241 U1 | | 2/2014 | |
| EP | 0024438 A1 | * | 3/1981 | |
| EP | 2570223 B1 | * | 4/2017 | ........... B23K 35/383 |
| EP | 3650156 A1 | * | 5/2020 | ......... B23K 37/0217 |
| GB | 1537236 | | 12/1978 | |
| GB | 2254816 A | * | 10/1992 | ............... B23K 9/16 |
| JP | 2000137023 A | * | 5/2000 | |
| KR | 20100011238 A | * | 2/2010 | |
| KR | 20150125390 A | * | 11/2015 | |
| WO | WO-9611765 A1 | * | 4/1996 | ........... B23K 9/0286 |
| WO | WO 2014130374 A1 | | 8/2014 | |
| WO | WO-2015112242 A1 | * | 7/2015 | ........... B23K 31/125 |

* cited by examiner

ORBITAL WELDING DEVICE WITH IMPROVED RESIDUAL OXYGEN MEASUREMENT

TECHNICAL FIELD

The invention relates generally to orbital welding devices with residual oxygen measurement.

BACKGROUND

The prior art WO 2014/130374 discloses an orbital welding device in which an optical oxygen sensor is arranged within the housing, which forms a chamber for shielding gas, or as an alternative outside said housing, a suction device connected to the chamber additionally being present in this case.

What the inventors found to be disadvantageous is that when the oxygen sensor is arranged within the housing, which forms a chamber for shielding gas, the oxygen sensor can be damaged on account of the heat of the welding process. In the case of an arrangement outside the housing, the provision of a suction device is laborious and results in a measurement delay.

SUMMARY

The problem addressed by the invention was to improve the above-mentioned disadvantage. The problem is solved by the invention, in particular as defined in the independent claims.

In particular, this problem is solved by an orbital welding device, the orbital welding device having a welding current source in a welding current source housing and an orbital welding head, which is separate from the welding current source housing and is connected to the welding current source by means of a cable, the orbital welding head having a pipe mount and a welding electrode holder, which is mounted rotatably with respect to the pipe mount and is intended for holding the welding electrode, the orbital welding device having an electric motor, which is preferably actuated by a motor controller of the orbital welding device and is designed to drive the welding electrode holder and thus turn it with respect to the pipe mount, the orbital welding head or the cable or a gas line to the orbital welding head or the orbital welding device in or on the welding current source housing having an optical oxygen sensor and the orbital welding head having a chamber for shielding gas, which is designed to surround a welding electrode of the orbital welding head and substantially seal it off from the outside during a welding process, the optical oxygen sensor being designed to measure an oxygen concentration in a measuring region in the chamber, wherein the oxygen sensor is arranged outside the chamber and the oxygen sensor, preferably a light-sensitive area, e.g. of a photodiode, of the oxygen sensor, is optically coupled to the measuring region by means of an optical coupling.

As a result, the oxygen sensor is arranged outside the chamber and thus in a protected manner on or in the orbital welding head or cable or on or in the welding current source housing and a virtually delay-free measurement without a suction device is made possible at the same time. In the case of arrangement on or in the cable, the region near the orbital welding head is preferred. In the case of arrangement on or in the cable or on or in the gas line or on or in the welding current source housing, the optical coupling is preferably effected via one or more optical waveguides, preferably optical fibers, which are led along the cable or the gas line, are linked at least regionally and are preferably inserted into the outermost or an inner cable sheath. The arrangement is preferably a securing in such a way that the oxygen sensor for the envisaged oxygen measurements remains or can remain there. The optical coupling is likewise preferably integrated, such that no loose optical waveguides need be handled separately.

Preferably, the cable has a minimum length of 1 m, preferably 2 m, particularly preferably 5 m. The pipe mount is preferably a pincers-like clamping mount. The welding current source is preferably stationary, while the orbital welding head is manually portable.

Substantially sealed off means, with regard to the chamber, that gaps or small openings can also be present, but they are so small that they do not impede the formation of a shielding gas atmosphere (preferably with less than 20 ppm, particularly preferably less than 10 ppm, residual oxygen) in the chamber. The chamber is preferably configured in such a way that the pipe pieces that are intended to be welded onto one another are enclosed by the chamber at the ends to be connected. The chamber preferably has an inlet, e.g. with a hose connection, for shielding gas, with which the chamber can thus be filled. In this case, the air formerly present is then forced out of the chamber through the small gaps or openings mentioned above. The chamber can also have a dedicated gas outlet.

The chamber is preferably designed in such a way that the welding electrode can be rotated around the pipe pieces to be welded in the chamber.

The light-sensitive area of the oxygen sensor is preferably the area at which light is converted into an electrical signal using the photoelectric effect, e.g. the light-sensitive area of a photodiode.

Preferably, the orbital welding head has a housing, which adjoins the chamber and which forms, e.g. for a user a handle or a housing for operating or switching elements and/or the motor, and the oxygen sensor is arranged in or on the housing.

In a further orbital welding device according to the invention, provision is made for the optical coupling to be at least partially formed by an opening in a wall of the chamber.

This results in a simple realization.

The oxygen sensor is preferably arranged behind the wall of the chamber and the light-sensitive area of the oxygen sensor is directed toward the opening.

Particularly preferably, one or more mirrors are arranged into the beam path between opening and light-sensitive area of the oxygen sensor, such that the beam path can extend around corners, as a result of which the position of the oxygen sensor can be chosen more flexibly. Preferably, the opening is closed off by a light guiding element, e.g. a piece of glass.

In a further orbital welding device according to the invention, provision is made for the optical coupling to be at least partially formed by a light guiding element.

As a result, the position of the oxygen sensor is able to be chosen even more flexibly.

In a further orbital welding device according to the invention, provision is made for the light guiding element to be at least partially formed by an optical fiber.

As a result, the position of the oxygen sensor is able to be chosen even more flexibly in conjunction with a very small space requirement of the light guiding element.

Preferably, the optical fiber is directed, preferably through the opening, toward the measuring region.

In a further orbital welding device according to the invention, provision is made for the oxygen sensor, preferably a light-sensitive area, e.g. of a photodiode, of the oxygen sensor, to be optically coupled to a further measuring region in the chamber by means of a further optical coupling.

The reliability of the measurement is increased as a result. By taking account of different measuring regions by means of one sensor, virtually a mean value is formed, which better represents the oxygen concentration in the chamber.

The further measuring region can have overlap regions with the first measuring region, but overall is different.

Preferably, the optical coupling is at least partially formed by a further opening in a wall of the chamber.

Preferably, the optical coupling is at least partially formed by a further light guiding element.

Preferably, the further light guiding element is at least partially formed by a further optical fiber, which is preferably directed, preferably through the further opening, toward the further measuring region.

In a further orbital welding device according to the invention, provision is made for the orbital welding head to have at least one further oxygen sensor, the further oxygen sensor, preferably a light-sensitive area, e.g. of a photodiode, of the oxygen sensor, being optically coupled to a further measuring region in the chamber by means of a further optical coupling.

As a result, the reliability and accuracy of the measurement are increased since it is now possible to measure a spatial distribution of the oxygen concentration in the chamber.

The further measuring region can have overlap regions with the first measuring region, but is different overall.

Preferably, the optical coupling is at least partially formed by a further opening in a wall of the chamber.

Preferably, the optical coupling is at least partially formed by a further light guiding element.

Preferably, the further light guiding element is at least partially formed by a further optical fiber, which is preferably directed, preferably through the further opening, toward the further measuring region.

In a further orbital welding device according to the invention, provision is made for the orbital welding device, preferably the orbital welding head, to have an electrical closed-loop control device, which is designed to start a welding process as soon as the oxygen concentration in one or more of the measuring regions has gone below a predetermined threshold value.

This results in a timesaving for the welding process. Usually, in the prior art, the welding process is started after a predetermined time following the introduction of the shielding gas into the chamber, the predetermined time being dimensioned generously enough that the oxygen concentration is sufficiently low with a high degree of certainty, with the result that unnecessarily long waiting occurs.

BRIEF DESCRIPTION OF THE DRAWINGS

The invention will now be illustrated further by way of example with reference to drawings, in which.

DETAILED DESCRIPTION

Figure 1:
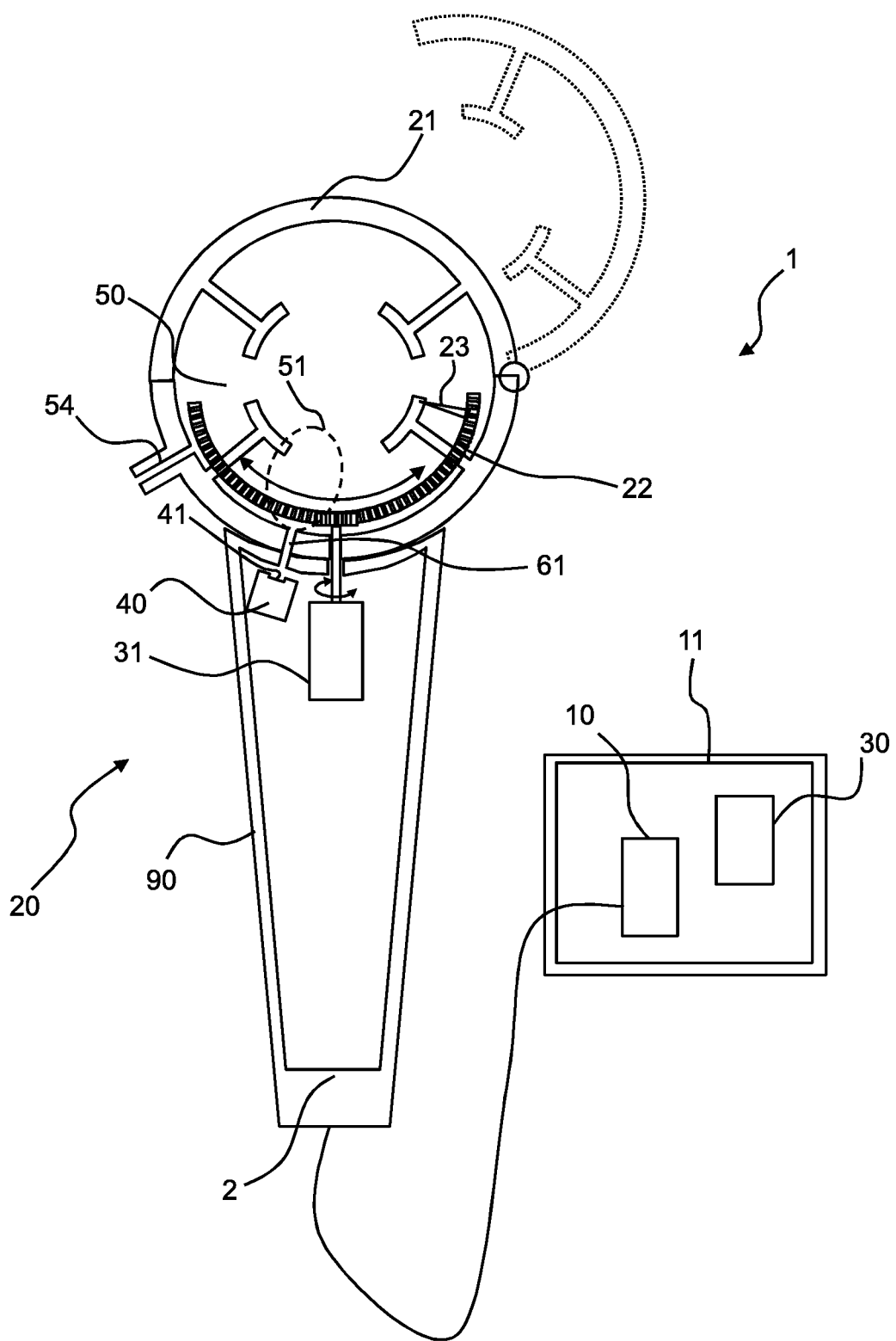
FIG. 1 shows a first embodiment of a device according to the invention.

FIG. 1 will now be described in greater detail. The configuration is such that the orbital welding device 1 has a welding current source 10 in a welding current source housing 11 and an orbital welding head 20, which is separate from the welding current source housing 11 and is connected to the welding current source 10 by means of a cable 2, the orbital welding head 20 having a pipe mount 21 and a welding electrode holder 22, which is mounted rotatably with respect to the pipe mount 21 and is intended for holding the welding electrode 23, the orbital welding device 1 having an electric motor 31, which is actuated here by a motor controller 30 of the orbital welding device 1 and is designed to drive the welding electrode holder 22 and thus turn it with respect to the pipe mount 21, the orbital welding head 20 having an optical oxygen sensor 40 and a chamber 50 for shielding gas, which is designed to surround a welding electrode 23 of the orbital welding head 20 and substantially seal it off from the outside during a welding process, the optical oxygen sensor 40 being designed to measure an oxygen concentration in a measuring region 51 in the chamber 50, wherein the oxygen sensor 40 is arranged outside the chamber 50 and the oxygen sensor 40, here a light-sensitive area 41, e.g. of a photodiode, of the oxygen sensor 40, is optically coupled to the measuring region 51 by means of an optical coupling. The pipe mount 21 is closable by a hinged mechanism. Here the cable 2 has a minimum length of 1 m, here 2 m. The chamber 50 is configured here in such a way that the pipe pieces which are intended to be welded onto one another are enclosed by the chamber 50 at the ends to be connected. The chamber 50 here has an inlet 54, e.g. with a hose connection, for shielding gas, with which the chamber can thus be filled. The chamber 50 is designed here in such a way that the welding electrode 23 can be rotated around the pipe pieces to be welded in the chamber 50. The light-sensitive area 41 of the oxygen sensor 40 here is a photodiode. Here the orbital welding head 20 has a housing 90, which adjoins the chamber 50 and which forms e.g. for a user a handle and a housing for the motor 31, and the oxygen sensor 40 is arranged in the housing 90. The configuration is such that the optical coupling is at least partially formed by an opening 61 in a wall of the chamber 50. Here the oxygen sensor 40 is arranged behind the wall of the chamber 50 and the light-sensitive area 41 of the oxygen sensor 40 is directed toward the opening 61.

Figure 2:
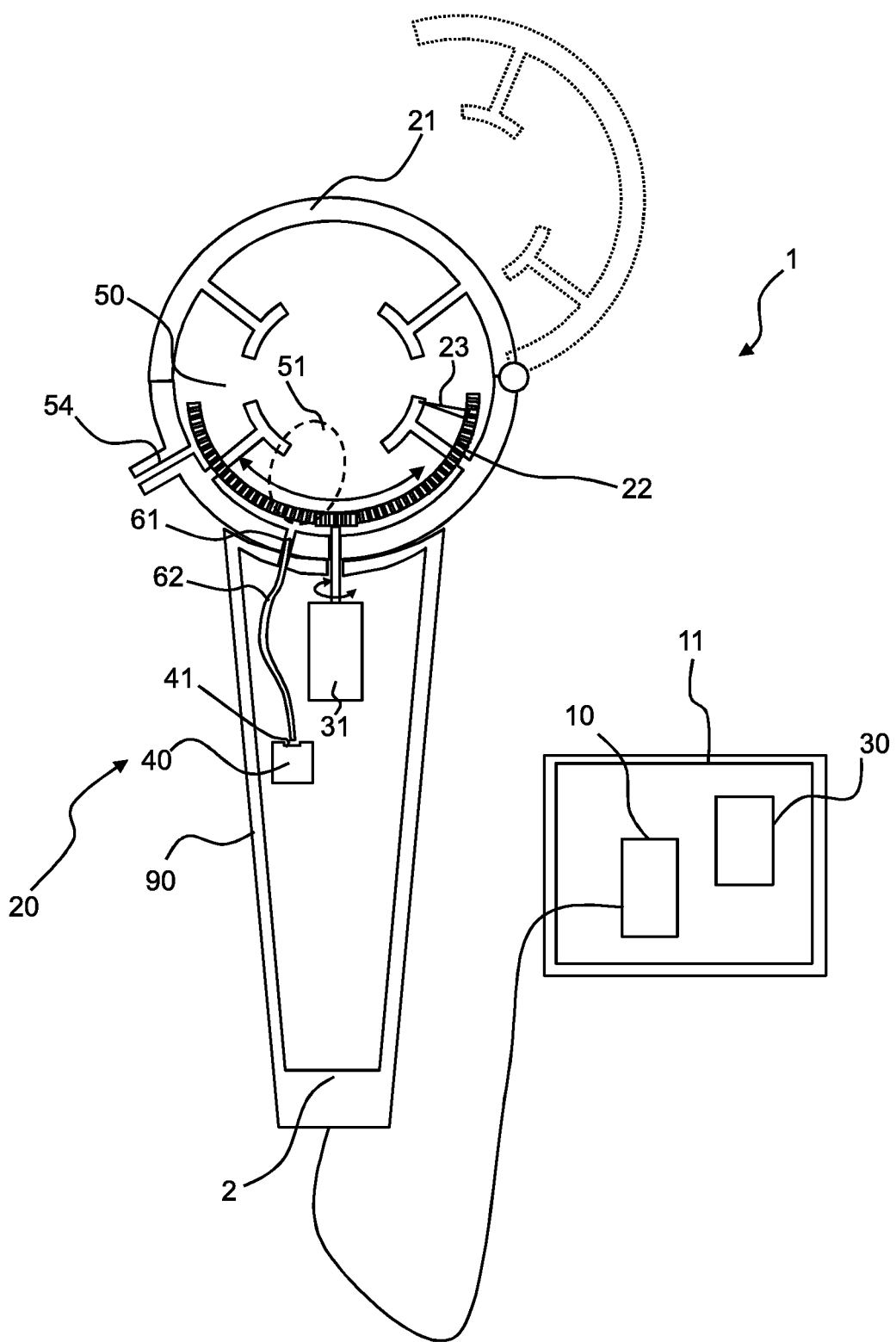
FIG. 2 shows a second embodiment of a device according to the invention on the basis of the first embodiment.

FIG. 2 will now be described in greater detail. The configuration is such that the optical coupling is at least partially formed by a light guiding element 60, in contrast to FIG. 1. The configuration is such that the light guiding element 60 is at least partially formed by an optical fiber 62.

Figure 3:
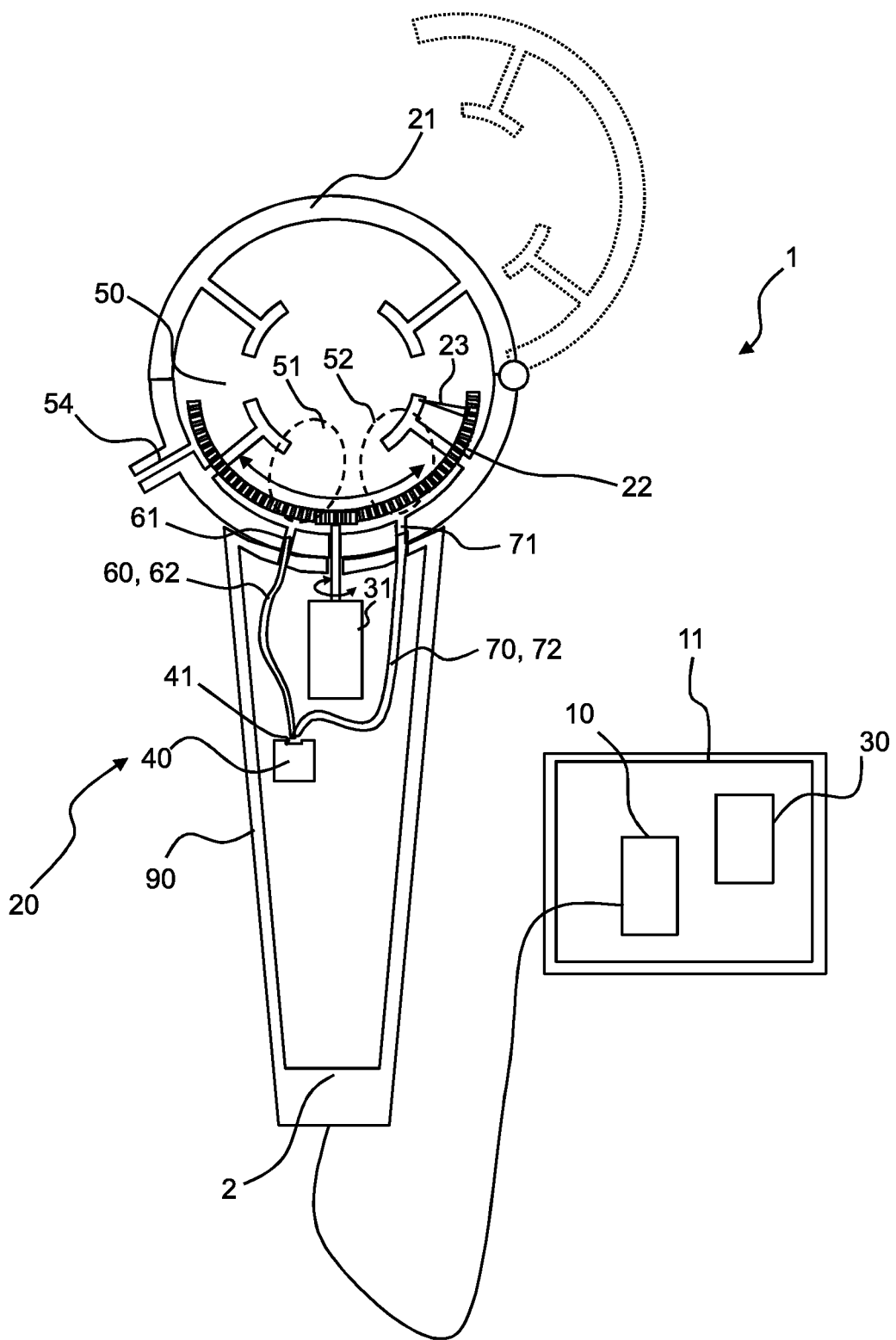
FIG. 3 shows a third embodiment of a device according to the invention on the basis of the second embodiment.

FIG. 3 will now be described in greater detail. The configuration is such that the oxygen sensor 40, here the light-sensitive area 41 of the oxygen sensor 40, is optically coupled to a further measuring region 52 in the chamber 50 by means of a further optical coupling, in contrast to FIG. 2. Here the optical coupling is at least partially formed by a further opening 71 in a wall of the chamber 50. Here the optical coupling is at least partially formed by a further light guiding element 70. Here the further light guiding element 70 is at least partially formed by a further optical fiber 72, which is directed through the further opening 71 toward the further measuring region 52.

Figure 4:
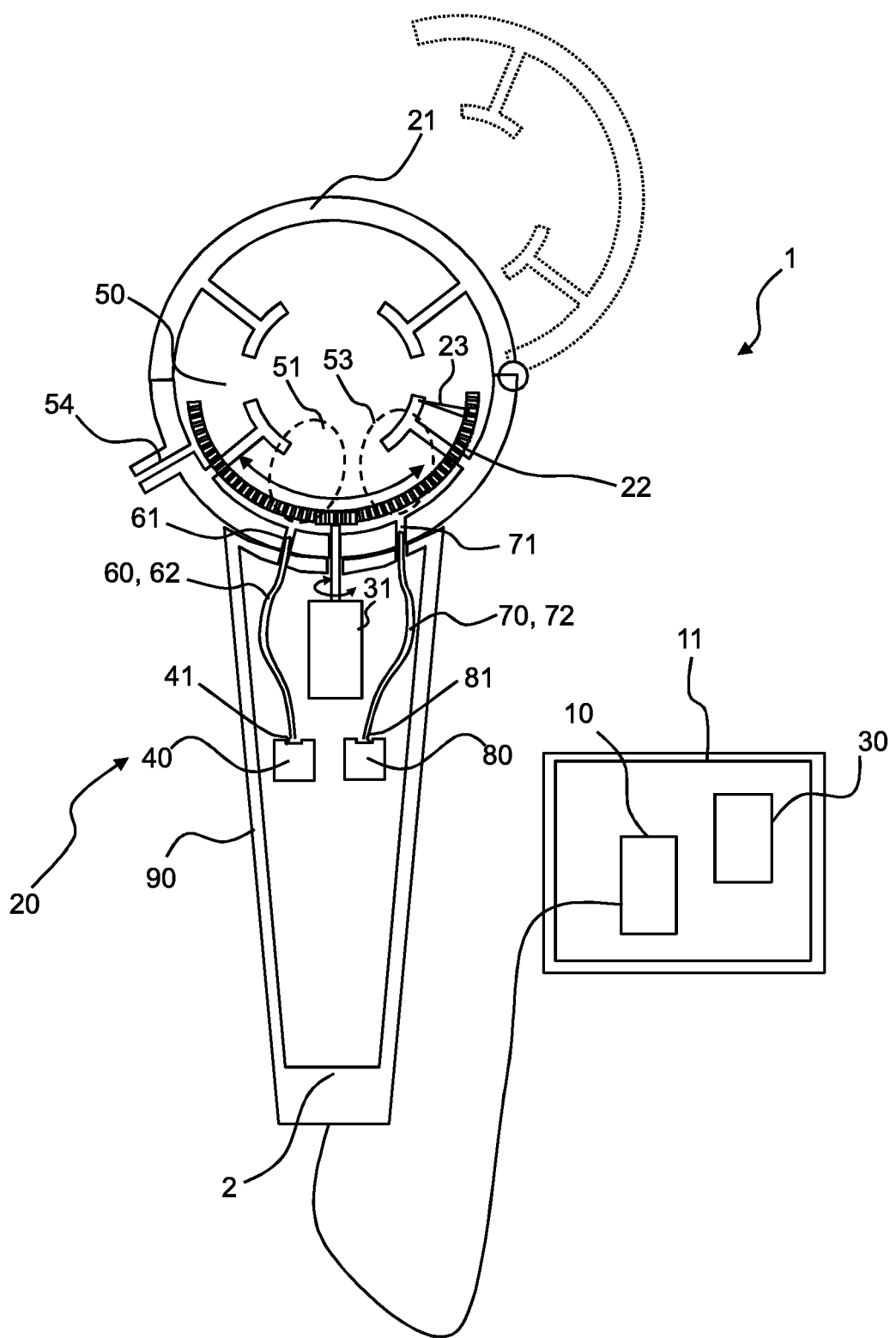
FIG. 4 shows a fourth embodiment of a device according to the invention on the basis of the third embodiment.

FIG. 4 will now be described in greater detail. The configuration is such that the orbital welding head 20 has at least one further oxygen sensor 80, the further oxygen sensor 80, here a light-sensitive area 81, e.g. of a photodiode, of the oxygen sensor 80, being optically coupled to a further measuring region 53 in the chamber 50 by means of a further optical coupling, in contrast to FIG. 3. The further measuring region can have overlap regions with the first measuring region, but is different overall. Here the optical coupling is at least partially formed by a further opening 71 in a wall of the chamber 50. Here the optical coupling is at least partially formed by a further light guiding element 70. Here the further light guiding element 70 is at least partially formed by a further optical fiber 72, which is directed through the further opening 71 toward the further measuring region 53.

REFERENCE SIGNS

1 Orbital welding device
2 Cable
10 Welding current source
11 Welding current source housing
20 Connected orbital welding head
21 Pipe mount
22 Mounted welding electrode holder
23 Welding electrode
30 Motor controller
31 Electric motor
40 Optical oxygen sensor
41 Light-sensitive area
50 Sealed-off chamber
51 Measuring region
52 Further measuring region
53 Further measuring region
54 Inlet
60 Light guiding element
61 Opening
62 Optical fiber
70 Further light guiding element
71 Further opening
72 Further optical fiber
80 Further oxygen sensor
81 Light-sensitive area
90 Housing

The invention claimed is:

1. An orbital welding device, comprising:
a welding current source in a welding current source housing;
an orbital welding head, which is separate from the welding current source housing and is connected to the welding current source by a cable, the orbital welding head comprising an orbital welding head housing, a pipe mount, a welding electrode holder mounted rotatably with respect to the pipe mount and configured to hold a welding electrode, and a chamber for shielding gas configured to surround the welding electrode of the orbital welding head and substantially seal the welding electrode off from an environment during a welding process;
an electric motor configured to drive the welding electrode holder and turn the electrode holder with respect to the pipe mount,
wherein the orbital welding head comprises an optical oxygen sensor configured to measure an oxygen concentration in a measuring region in the chamber, wherein the oxygen sensor is arranged outside the chamber and inside the orbital welding head housing, and the oxygen sensor is optically coupled to the measuring region by an optical coupling.

2. The orbital welding device as claimed in claim 1, the optical coupling being at least partially formed by an opening in a wall of the chamber.

3. The orbital welding device as claimed in claim 1, the optical coupling being at least partially formed by a light guiding element.

4. The orbital welding device as claimed in claim 3, the light guiding element being at least partially formed by an optical fiber.

5. The orbital welding device as defined in claim 1, wherein the oxygen sensor is optically coupled to a further measuring region in the chamber by means of a further optical coupling.

6. The orbital welding device as defined in claim 1, wherein the orbital welding head comprises at least one further oxygen sensor, the further oxygen sensor being optically coupled to a further measuring region in the chamber by means of a further optical coupling.

7. The orbital welding device as defined in claim 1, wherein the orbital welding device comprises an electrical closed-loop control device configured to start a welding process as soon as the oxygen concentration in one or more of the measuring regions has gone below a predetermined threshold value.

* * * * *